United States Patent [19]

Baer et al.

[11] 4,023,247

[45] May 17, 1977

[54] VARIABLE SPEED SHEAVE ASSEMBLIES AND METHOD OF PRODUCING

[75] Inventors: Lewis E. Baer, Hagerstown, Md.; William A. Williams, Philadelphia; Carroll G. Wright, Fayetteville, both of Pa.

[73] Assignee: T. B. Wood's Sons Company, Chambersburg, Pa.

[22] Filed: Aug. 6, 1975

[21] Appl. No.: 602,250

Related U.S. Application Data

[62] Division of Ser. No. 510,174, Sept. 30, 1974.

[52] U.S. Cl. .............. 29/149.5 R; 29/149.5 NM; 29/149.5 S; 29/149.5 C; 308/238
[51] Int. Cl.² ........................................ B21D 53/10
[58] Field of Search ............ 29/149.5 NM, 149.5 B, 29/149.5 R; 74/230, 17 BC; 308/237 R, 238, 239, 241

[56] References Cited

UNITED STATES PATENTS

| | | | |
|---|---|---|---|
| 2,554,008 | 5/1951 | Burger | 29/149.5 NM |
| 3,056,709 | 10/1962 | Rising et al. | 308/238 |
| 3,172,797 | 3/1965 | Bungardt | 29/149.5 NM |
| 3,218,383 | 11/1965 | White | 308/238 X |
| 3,342,667 | 9/1967 | Berlinghof, Jr. | 308/238 X |
| 3,668,040 | 6/1972 | Clark | 308/239 X |
| 3,802,285 | 4/1974 | Williams | 308/238 X |

FOREIGN PATENTS OR APPLICATIONS

| | | | |
|---|---|---|---|
| 1,237,789 | 6/1960 | France | 308/238 |
| 806,412 | 7/1949 | Germany | 29/149.5 R |

*Primary Examiner*—C.W. Lanham
*Assistant Examiner*—V. K. Rising
*Attorney, Agent, or Firm*—B. P. Fishburne, Jr.

[57] ABSTRACT

An adjustable flange for a dry lube variable speed sheave assembly having an unmachined bore is centered on a vacuum fixture. A thin dry bearing material is secured and located axially and radially within the flange bore and the annular space between the thin dry bearing material and the flange bore is filled with a high compressive modulus material such as epoxy. The dry bearing material is maintained flat during the process by the application of vacuum through the fixture. After curing, the completed adjustable flange is removed for the fixture and assembled with the sleeve component of a sheave. In accordance with a variation of the method, the separately formed thin dry bearing material is eliminated and a suitable dry lube material is mixed with the epoxy-like cement prior to injecting the same into said annular space. Following curing, this material becomes the dry lube bearing of the flange.

6 Claims, 9 Drawing Figures

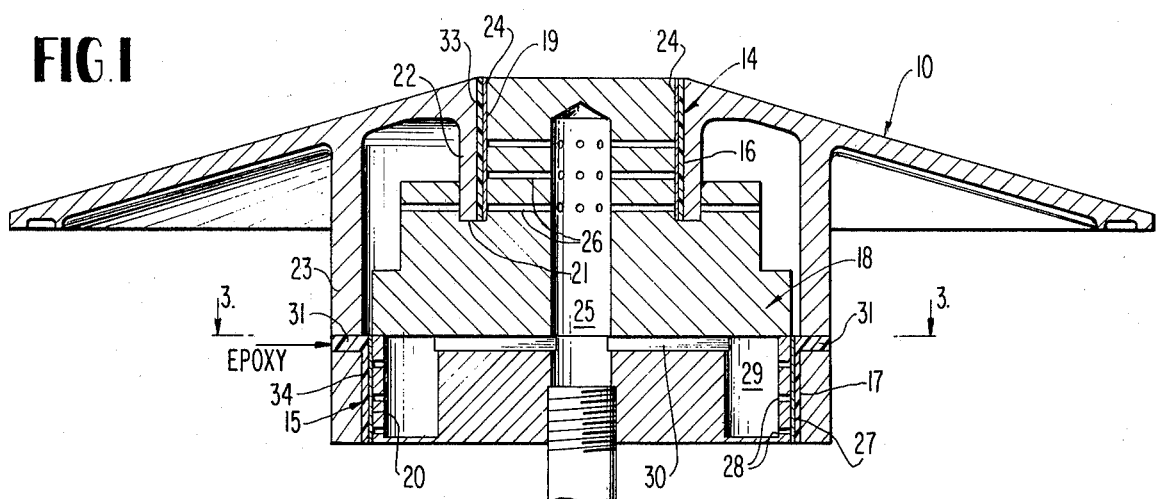
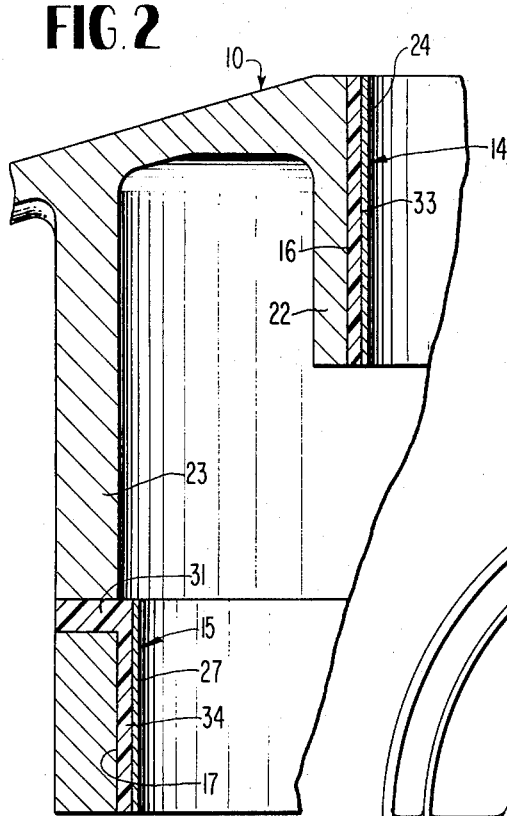
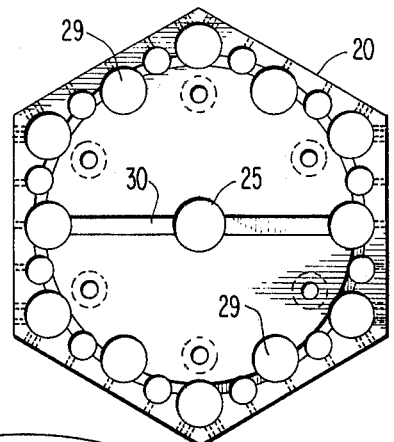
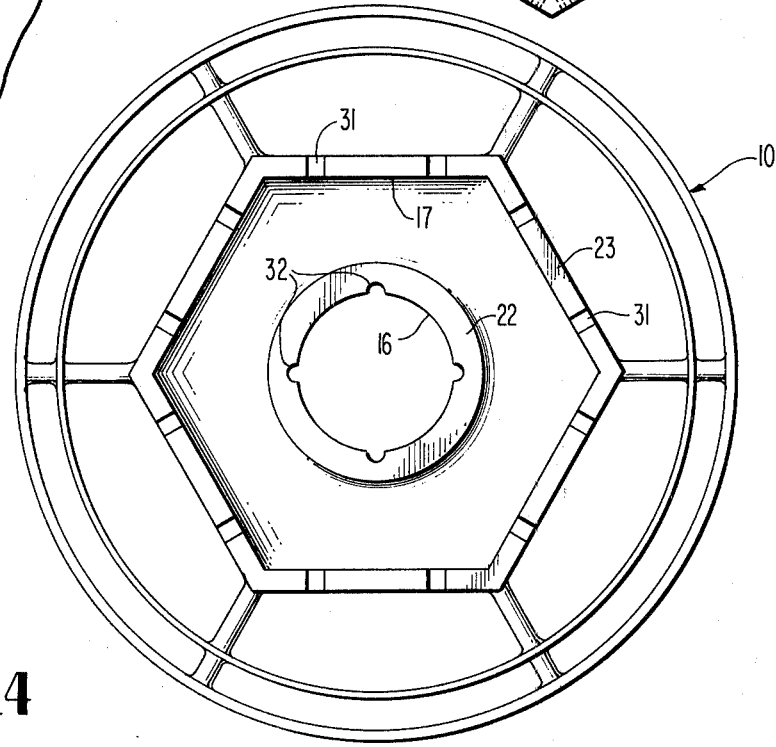

VARIABLE SPEED SHEAVE ASSEMBLIES AND METHOD OF PRODUCING

This is a division of application Ser. No. 510,174, filed Sept. 30, 1974.

BACKGROUND OF THE INVENTION

Variable speed sheaves have been made for years with boundary or dry lubricating bearings of various materials, such as bronze, graphite, TFE-filled materials, nylon, acetal, wood and many others. Such bearing materials have been utilized for variable speed sheaves in both open belted and enclosed belted assemblies. However, the numerous prior art proposals have continued to fall short of meeting the several requirements necessary to achieve satisfactory sheave life. These requirements are, briefly, as follows:

(1) The radial clearance between the bore of the dry bearing in the flange and the outside diameter of the sleeve must be minimal to limit angular displacement or cocking of the flange due to belt tension. Angular displacement of the flange is directly proportional to radial clearance, as fixed by the geometry of a given sheave. If the initial radial clearance is too large, two serious problems result. First, the angular displacement of the flange becomes great enough to destroy the V-belt and, second, the life of the dry lube bearing is drastically shortened. It is well known that the radial clearances of any dry lube bearing increase as a parabolic (squared) function with respect to time. As the radial clearances become greater, the flange vibrates and generates noise. Dry lube variable speed sheaves now on the market employing conventional dry bearing materials, as mentioned above, require relatively large initial clearances to compensate for inside diameter "close-in" resulting from heat. The final radial clearances, however, are still too great (.002 inch or more) to promote good bearing life of 10,000 hours or more.

The present invention allows the making of a dry lube variable speed sheave which insures as close a radial fit as required by the particular material. In some instances, a very slight interference fit in the sheave assembly is desirable to compensate for bearing material creep or deformation. The invention also assures repeatability in the attainment of the dry bearing bore size or inside diameter as required by the sheave geometry. Most importantly, the method assures an accurate bore for the dry bearing regardless of the thickness tolerance of any bearing component. Conventional designs are much more dependent on the manufacturing tolerances of the bearing assembly components.

(2) Another requirement for a dry lube variable speed sheave is the axial retention of the bearing material in the adjustable flange bore. Some conventional designs employ a pressfit of graphite, bronze or the like into the flange bore. The disadvantage of this lies in the cost of obtaining close tolerance diameters to achieve the required interferences and the fracture possibility for the bearing component during insertion. The present invention completely alleviates this difficulty in the prior art by use of a dry lube bearing component of proper length which after preparation (etching, etc.) is chemically bonded with an epoxy cement in the adjustable flange bore.

(3) A third and critical requirement for a long life sheave of the contemplated type relates to the compressive stiffness of the dry bearing material. The bearing material must exhibit high compressive stiffness and low permanent deformation (creep) under load. The invention permits the use of a thin dry bearing material of high compressive stiffness and low permanent deformation to reduce angular displacement or cocking of the adjustable flange.

(4) The invention eliminates the necessity for machining the bore of the adjustable flange to receive a dry bearing. Machining bores to close tolerances is expensive and is an important competitive factor in connection with variable speed sheaves. There is no known unit currently on the market which does not require machining of the flange bore or bores and thus the invention meets this usual requirement by eliminating it.

Other novel features and advantages of the invention will become apparent during the course of the following detailed description.

BRIEF DESCRIPTION OF DRAWING FIGURES

FIG. 1 is a central vertical section through an adjustable flange of a variable speed sheave and an associated vacuum fixture employed in the formation of dry lube bearings for the flange bores according to the invention.

FIG. 2 is an enlarged fragmentary vertical section taken through the flange after the completion of the bearing and removal of the flange from the fixture.

FIG. 3 is a plan view of the lower part of the fixture taken on line 3—3 of FIG. 1.

FIG. 4 is an end elevational view of the flange shown in FIG. 1.

DETAILED DESCRIPTION

Figure 6:
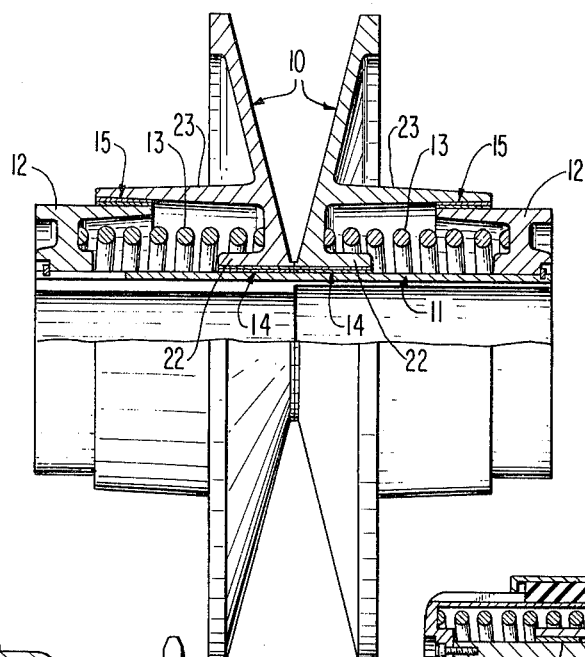
FIGS. 6 through 9 are cross sectional views through some types of variable speed sheaves on which dry lube bearings formed in accordance with the invention may be utilized.

Referring to the drawings in detail, wherein like numerals designate like parts, the numeral 10 designates an adjustable flange component for a variable speed sheave of the type shown in FIG. 6 employing two such adjustable flanges in conjunction with a sleeve component 11 having end caps 12. In this arrangement, the adjustable flanges 10 are biased toward each other by compression springs 13 as shown in FIG. 6. Inboard and outboard dry lube bearings 14 and 15 are utilized in the two concentric bores of each flange 10, and the invention now to be described with particular reference to FIGS. 1 through 5 is concerned with these dry lube bearings and the method of making them with great accuracy to achieve fully the previously-noted requirements for the invention.

Referring to FIG. 1, the flange component 10 has first and second unmachined bores 16 and 17 which may be typically die cast with the remainder of the flange. The flange 10 is temporarily placed over and assembled with a vacuum fixture 18 having stepped diameter portions 19 and 20 of relatively high concentricity. The vacuum fixture possesses an annular groove 21 in its upper portion which receives the inboard hub 22 of the flange 10 and locates it accurately both axially and with respect to concentricity. An annular space is provided between the unmachined bore 16 and the periphery of the smaller diameter portion 19. The aforementioned inboard dry lube bearing 14 is formed by the invention method in this annular space, as will be further described.

Similarly, the outboard hub 23 of flange 10 is telescoped over the larger diameter portion 20 of fixture 18 with another annular space intervening to allow the formation of the outboard dry lube bearing 15 in accordance with the invention method. The two fixture diameters 19 and 20 are highly concentric so that the bores of the bearings 14 and 15 produced by the invention will be concentric. In terms of the flange 10 per se, no machining of the flange bore or bores is required and prior to the formation of the dry lube bearings therein by the invention, these flange bores formed by casting or the like need not be highly concentric in terms of usual machining tolerances. This is an important feature in the economics of the invention which should be fully appreciated.

According to a preferred embodiment of the invention, a thin strip or tape 24, such as a TFE-filled tape, bronze-filled strip, glass-filled laminate or mylar, preferably etched or otherwise prepared in a known manner for bonding with epoxy-type cement, is placed as a ring on the fixture diameter portion 19. This thin strip 24 of dry bearing material is held flat against the fixture periphery 19 by vacuum produced through an axial passage 25 in the fixture 18 and communicating radial vacuum ports 26. A similar thin tape or strip 27 of dry bearing material is placed around the fixture periphery 20 and held in full circumferential contact therewith by vacuum through radial ports 28 and communicating passages 29 and 30 leading to the central passage 25.

It should be clarified at this point that the hubs 22 and 23 of flange 10 are annular and polygonal, respectively, as illustrated in FIG. 4. The foregoing description has been in reference to a pair of concentric annular flange hubs having bores. In practice, the invention is applicable to flanges whose hubs have any desired cross sectional shape, and thus the arrangement in the drawings is illustrative only and should not be construed in a limiting sense. While the description will continue to make reference to two hubs or two bores, it will be understood that these elements may be circular or polygonal or one may be circular and the other polygonal, as illustrated in FIG. 4.

Returning to FIG. 1, the dry bearing strip 27 will be held by vacuum against the fixture portion 20 in a flattened condition, regardless of the shapes of the hub portion 23 and fixture 18 in this region. As with the inboard hub 22, an intervening space is provided between the bore of the outboard hub 23 and the tape-like dry bearing element 20 for the completion of the bearing in accordance with the invention.

In such completion process, epoxy cement or equivalent material which, after curing, has a very high compressive modulus is injected either through the fixture 18 or through sprues 31 and 32 of the flange element 10 into the two intervening spaces between the strips 24 and 27 and the bores 16 and 17 until these spaces are filled with the epoxy as shown at 33 and 34 in the drawings. The epoxy cement will become firmly bonded to the bearing strips 24 and 27 and to the walls of the flange bores and after curing or hardening, the flange 10 is removed from the fixture 18 for assembly onto the sleeve component 11 including end caps 12, FIG. 6.

In essence, the process amounts to molding the dry lube bearing or bearings permanently inside of a flange bore or bores with a high degree of concentricity and accuracy, as described. With proper design, it is believed that the method may be practiced utilizing the sleeve component of the sheave as the centering and molding fixture in lieu of the special fixture 18 which has been illustrated. In any case, the surfaces of the fixture will be coated with an appropriate release agent to facilitate separation of the flange 10 with its molded bearings 14 and 15 after completion of the method.

Figure 5:
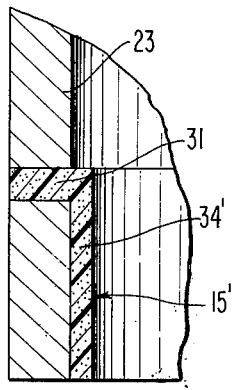
FIG. 5 is a fragmentary vertical section through a flange and dry lube bearing formed in accordance with a modification of the invention.

In accordance with a modification of the invention, substantially the same molding technique is utilized to form the dry lube bearings of the flange 10 except that the preformed thin bearing strips 24 and 27 are eliminated. Instead, referring to FIG. 5 showing the outboard dry lube bearing 15' according to the modification, epoxy-like cement 34' after mixing with TFE, graphite, molybdenum disulfide, or the like, is injected or introduced into the space between the fixture and the hub 23 and becomes the integral dry lube bearing after curing of the epoxy. This modified method is fully applicable to both the inboard and outboard bearings of the flange 10 regardless of the cross sectional shapes. As in the prior embodiment utilizing strips 24 and 27, no machining of flange bores is required, and it is the adjacent peripheral portions of the fixture 18 which accurately size the bores of the dry lube bearings and impart to them the required degree of concentricity. Either embodiment of the invention results in the production of an ideal dry lube bearing for variable speed sheaves, in terms of the major requirements set forth in the introductory portion of this application. The method in either of its two forms produces a dry lube bearing in such a manner that the desired close radial fits between critical sheave components are provided with a very high degree of repeatability. The method of producing the bearings is applicable to and compatible with various geometrical sheave forms as illustrated in FIGS. 6 through 9.

Figure 7:
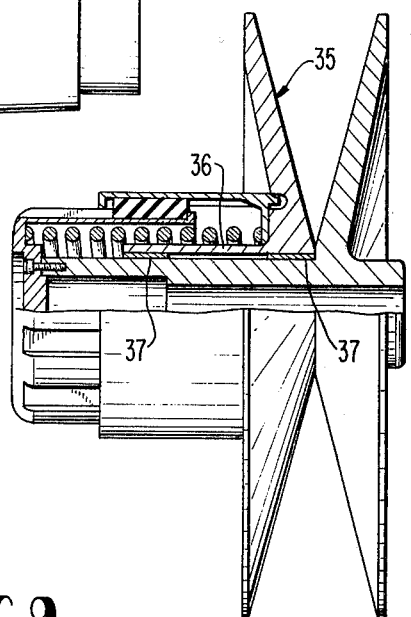
Figure 8:
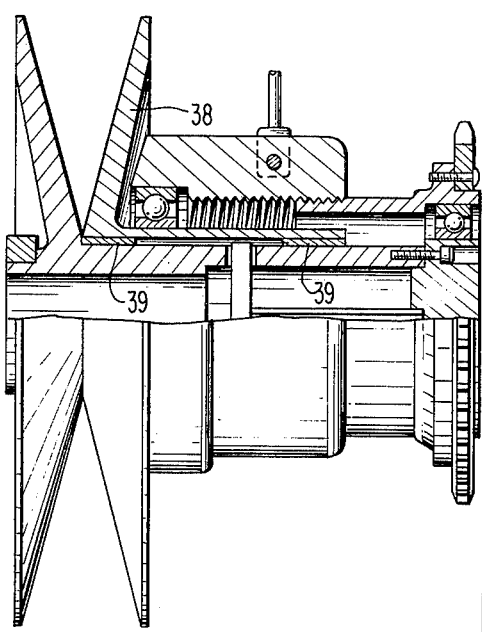
Figure 9:
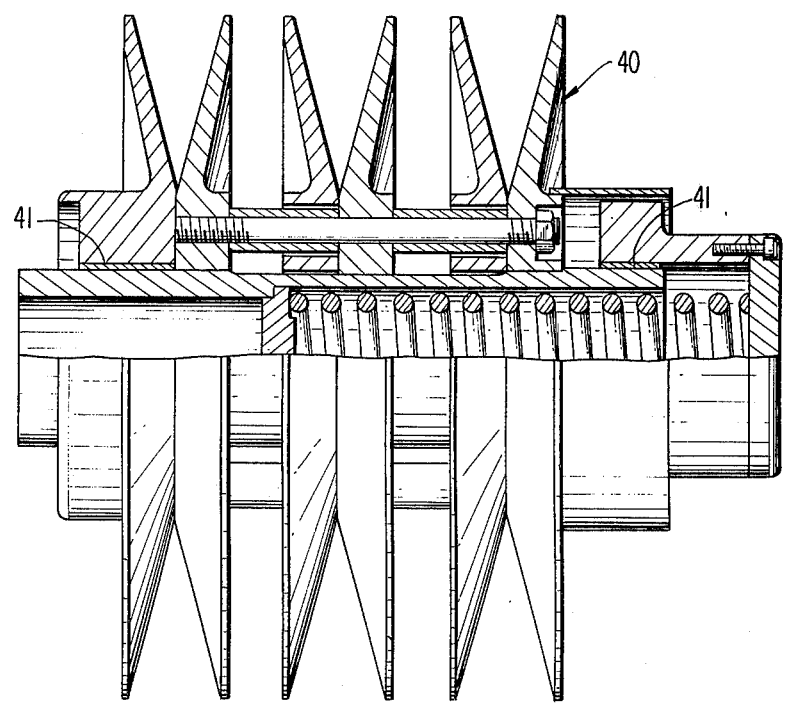

FIG. 7 shows that the invention is fully applicable to a variable speed sheave having a single adjustable flange 35, whose hub 36 is equipped with spaced dry lube bearings 37 made in accordance with the invention. Similarly, in FIG. 8, a sheave having a mechanically actuated adjustable flange 38 may also be equipped with bearings 39 in its hub portion according to the invention. In FIG. 9, a sheave 40 of multiple groove flange design may also have dry lube bearings 41 made in accordance with either variation of the method.

It is believed that the various advantages of the invention over the prior art will now be apparent to those skilled in the art without the necessity for further description herein.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A method of making an accurately sized dry lube bearing for a variable speed sheave flange comprising the steps of holding said flange on a vacuum fixture to thereby center the flange in relation to an accurate surface of the fixture, holding a preformed strip of dry lube bearing material on the fixture in contact with said accurate surface, and injecting high modulus hardening material between said preformed strip and an opposing surface of the flange to complete said bearing following the hardening of the high modulus material and the bonding thereof to said preformed strip and said opposing flange surface.

2. The method of claim 1, wherein said high modulus hardening material is epoxy cement.

3. The method of claim 1, wherein said accurate surface and said opposing surface are substantially concentric spaced annular surfaces, whereby the formed dry lube bearing is annular.

4. The method of claim 1, wherein said accurate surface is polygonal in cross section and said opposing surface is of like formation and spaced from the accurate surface to provide a polygonal cross section injection chamber for the formation of the dry lube bearing.

5. A method of making a dry lube bering for a variable speed sheave flange component with a high degree of accuracy and repeatability in terms of the internal diameter of the bearing, said flange component having an unfinished bore to receive the bearing, the method comprising the steps of temporarily assembling the flange component with a vacuum fixture which centers and axially positions said flange bore in relation to an accurate surface of the fixture and with an intervening chamber formed between said bore and fixture surface, placing a preformed thin strip of dry lube bearing material in said chamber and in contact with said accurate surface of said fixture, and filling said chamber with a cementitious material which cures to a hard high compressive modulus dry lube bearing body firmly bonded to said bore and firmly bonded to said strip so that the strip becomes an integral part of said dry lube bearing, and separating the flange component with the bearing from said fixture.

6. The method of claim 5, wherein said cementitious material is epoxy cement.

* * * * *